US009304286B1

(12) United States Patent  
Kath (10) Patent No.: US 9,304,286 B1  
(45) Date of Patent: Apr. 5, 2016

(54) DEPLOYABLE TACTICAL ROOM CLEARING MIRRORS

(71) Applicant: Jonathan Kath, Coral Springs, FL (US)

(72) Inventor: Jonathan Kath, Coral Springs, FL (US)

( * ) Notice: Subject to any disclaimer, the term of this patent is extended or adjusted under 35 U.S.C. 154(b) by 0 days.

(21) Appl. No.: 14/496,478

(22) Filed: Sep. 25, 2014

Related U.S. Application Data

(60) Provisional application No. 61/882,104, filed on Sep. 25, 2013.

(51) Int. Cl.
*G02B 7/182* (2006.01)

(52) U.S. Cl.
CPC ....................... *G02B 7/182* (2013.01)

(58) Field of Classification Search
CPC ........................................ G02B 7/182
USPC ..................... 359/871; 42/113, 118
See application file for complete search history.

(56) References Cited

U.S. PATENT DOCUMENTS

| 816,588 | A | | 4/1906 | Moore | |
|---|---|---|---|---|---|
| 858,964 | A | | 7/1907 | Dayton | |
| 918,724 | A | | 4/1909 | Austin | |
| 1,029,420 | A | | 6/1912 | Buzby | |
| 1,926,340 | A | * | 9/1933 | Kniep | 242/524 |
| 2,091,203 | A | | 8/1937 | Hay | |
| 2,432,920 | A | * | 12/1947 | Couchman McKay et al. | 102/387 |
| 2,880,651 | A | | 4/1959 | Fenyo | |
| 4,605,292 | A | * | 8/1986 | McIntosh | 359/870 |
| 4,856,888 | A | | 8/1989 | Wahl | |
| 4,863,239 | A | * | 9/1989 | Malone | 359/879 |
| 4,932,769 | A | | 6/1990 | Goosen | |
| 4,941,638 | A | | 7/1990 | DiSalvatore | |
| 5,076,701 | A | | 12/1991 | Greenlaw | |
| 5,103,347 | A | * | 4/1992 | Lumbra et al. | 359/871 |
| 5,173,804 | A | * | 12/1992 | Dogey | 359/507 |
| 5,222,000 | A | * | 6/1993 | Adler | 359/847 |
| 5,229,888 | A | | 7/1993 | Gustafsson | |
| 5,386,322 | A | | 1/1995 | Parsons | |
| 5,636,918 | A | | 6/1997 | Lott | |
| 5,943,175 | A | | 8/1999 | LaViola | |
| 6,130,790 | A | | 10/2000 | Tu | |
| 6,244,718 | B1 | | 6/2001 | Whitcomb | |
| 6,286,966 | B1 | | 9/2001 | Mandair | |
| 6,840,639 | B2 | | 1/2005 | Zadro | |
| 6,840,643 | B2 | | 1/2005 | Clemmer, Jr. | |
| 7,896,508 | B2 | * | 3/2011 | Dyson | 359/871 |
| 8,157,394 | B1 | * | 4/2012 | Downing | 359/868 |
| 2003/0227697 | A1 | * | 12/2003 | Dyson | 359/871 |
| 2007/0091487 | A1 | * | 4/2007 | DeFazio et al. | 359/859 |

(Continued)

*Primary Examiner* — Frank Font
(74) *Attorney, Agent, or Firm* — Mark D. Bowen; Malin Haley DiMaggio & Bowen, P.A.

(57) ABSTRACT

A tactical mirror system includes a convex mirror that may be rapidly deployed and adhesively affixed to a room entry door to provide a room entry team member with a view of the room interior from a concealed cover position outside the room adjacent to the doorway is disclosed. A rip-cord is affixed to allow the user to peel away a protective layer thereby exposing an adhesive coated surface thereby allowing for rapid affixation of the mirror. A pair of diametrically opposed notches and a resilient transversely disposed band that function to allow the mirror device to be removably mounted to a baton to allow a room entry team member to manually extend and position the mirror. A plurality of mirrors may be provided and configured for compact nested storage thereby providing the user with a plurality of deployable mirror devices.

10 Claims, 12 Drawing Sheets

(56) References Cited

U.S. PATENT DOCUMENTS

| | | |
|---|---|---|
| 2008/0078796 A1 | 4/2008 | Parsons |
| 2009/0094876 A1* | 4/2009 | Musser .......................... 42/118 |
| 2012/0005938 A1* | 1/2012 | Sloan ............................ 42/113 |
| 2012/0050900 A1* | 3/2012 | Heling et al. ................ 359/872 |
| 2013/0250389 A1* | 9/2013 | Ghai et al. .................. 359/221.2 |
| 2014/0085739 A1* | 3/2014 | Bohanan et al. .............. 359/841 |
| 2014/0168804 A1* | 6/2014 | Rothschild .................... 359/871 |
| 2015/0021899 A1* | 1/2015 | Coore-Widener .............. 281/29 |
| 2015/0173533 A1* | 6/2015 | Dolar et al. ................... 248/474 |

* cited by examiner

DEPLOYABLE TACTICAL ROOM CLEARING MIRRORS

CROSS REFERENCE TO RELATED APPLICATIONS

This application claims the benefit of provisional U.S. Patent Application Ser. No. 61/882,104, filed on Sep. 25, 2013.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all rights whatsoever.

BACKGROUND OF THE INVENTION

1. Field of the Invention

The present invention relates generally to tactical gear for use by law enforcement and military personnel, and more particularly to a man-portable tactical mirror system that may be rapidly deployed to provide law enforcement or military personnel with an around-the-coma view of a room or other part of a structure from a safe location.

2. Description of Related Art

Military and law enforcement personnel are often tasked with entering and clearing buildings and structures wherein an enemy, suspect, or fugitive (hereinafter the "Threat") is hiding or has taken refuge. This process is difficult, time consuming, and dangerous. In order to clear a building or objective, a clearing method or scheme of maneuver must be selected and employed based on potential consequences of delay (e.g. hostage lives, evidence, etc.), as well as potential risk to team members and occupants.

There are two primary methods of building clearing often employed, namely, deliberate clearing and dynamic clearing. The deliberate clearing method may allow the entry team time to get closer to the threat or target before being compromised, whereas the dynamic clearing method places greater emphasis on immediately controlling the objective. With either method, one or more clearing teams, each typically consisting of at least five team members, are tasked with controlling one or more objectives and/or threats. When the clearing team(s) enters the objective they typically systematically clear one room at a time while moving through the structure. Access to the various rooms to be cleared is most often through a doorway. The process on entering the room through the doorway renders the team most vulnerable as persons within the room are typically focused on that precise point. Accordingly, there exists a need for advancement in the art of room clearing gear and tactics that allows an entry team member to view the room interior without becoming exposed through the doorway.

BRIEF SUMMARY OF THE INVENTION

The present invention addresses needs for advancement in the art of room clearing tactics by providing a man-portable tactical room clearing mirror system including a convex mirror that may be rapidly deployed and adhesively affixed to a room entry door, which, when pushed open provides a room entry team member with a view of the room interior from a concealed cover position outside the room adjacent to the doorway. A room clearing mirror system in accordance with the present invention includes a mirror device sized to be easily carried and rapidly deployed by a person from a pocket or pouch. The mirror device includes a mounting surface and an opposing mirror surface. The mounting surface includes at least one generally planar portion adapted for adhesively securing the mirror device to a vertical door surface. The mirror surface is preferably generally convex to provide a wide angle field of view. The system provides an entry team member with a rapidly-deployable, adhesively-securable, convex mirror that may be affixed to the exterior of an inwardly opening room entry door so as to provide the entry team member(s) with a view of the room interior prior to entry thereby allowing the team member(s) to assess any possible threats from a concealed cover position outside the room prior to entry. A rip-cord is affixed to allow the user to peel away a protective layer thereby exposing an adhesive coated surface thereby allowing for rapid affixation of the mirror. Each mirror further includes a peripheral edge defining a pair of diametrically opposed notches and a resilient transversely disposed band that function to allow the mirror device to be removably mounted to a baton to allow a room entry team member to manually extend and position the mirror. A plurality of mirrors may be provided and configured for compact nested storage thereby providing the user with a plurality of deployable mirror devices.

Accordingly, it is an object of the present invention to provide advancements in the art of tactical building and room clearing.

Another object of the present invention is to provide a man-portable tactical mirror system to assist a room entry team member in the assessment of threats existing within a room while the team member remains in a safe, non-exposed location.

Yet another object of the present invention is to provide a tactical mirror system that may be easily carried and rapidly deployed to provide the user with a wide angle view of the room interior.

Still another object of the present invention is to provide a tactical mirror system adapted for removable mounting on a tactical baton.

Another object of the present invention is to provide a tactical mirror system wherein a plurality of mirrors may be nested in a compact configuration.

These and other objects are met by the present invention which will become more apparent from the accompanying drawing and the following detailed description of the drawings and preferred embodiments.

DETAILED DESCRIPTION OF THE INVENTION

The present invention may be understood more readily by reference to the following detailed description taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
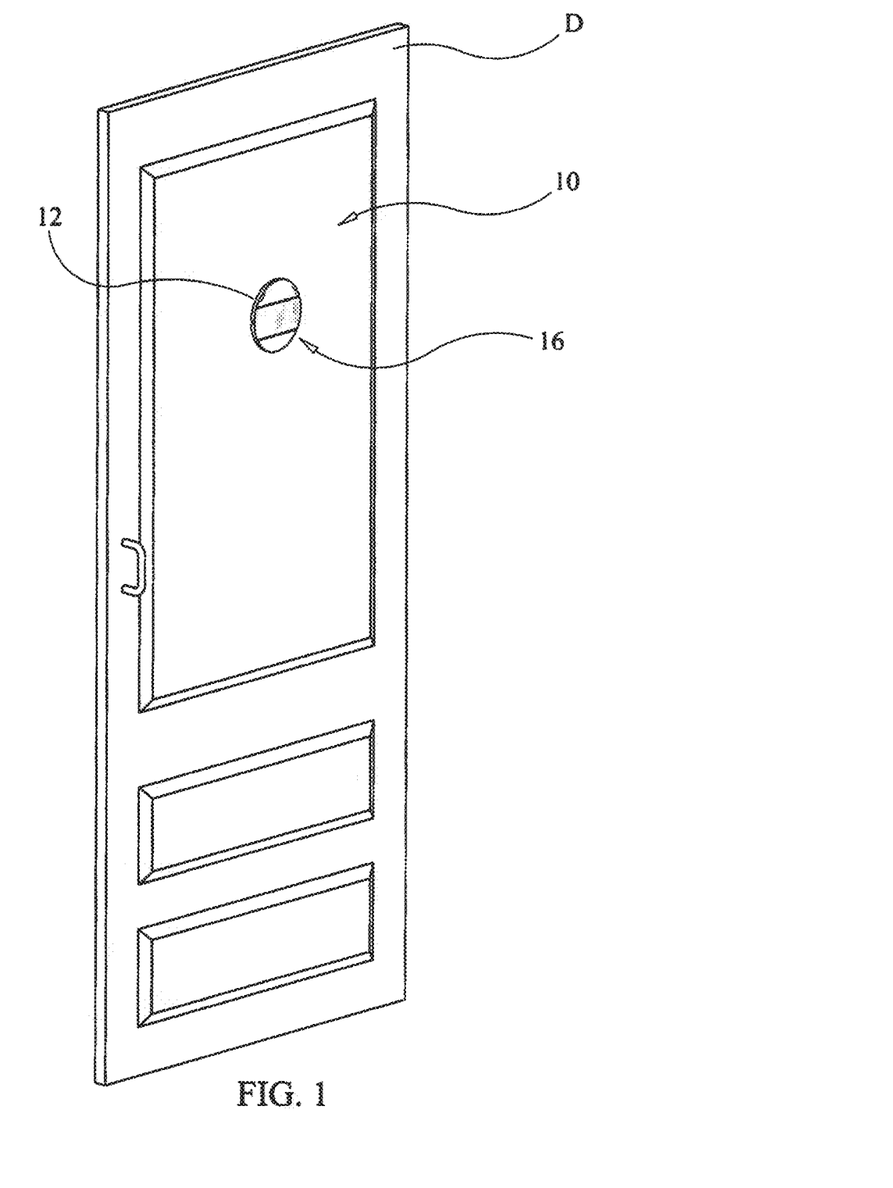
FIG. 1 depicts a tactical convex room clearing mirror in accordance with the present invention adhesively secured to a door.
Figure 2:
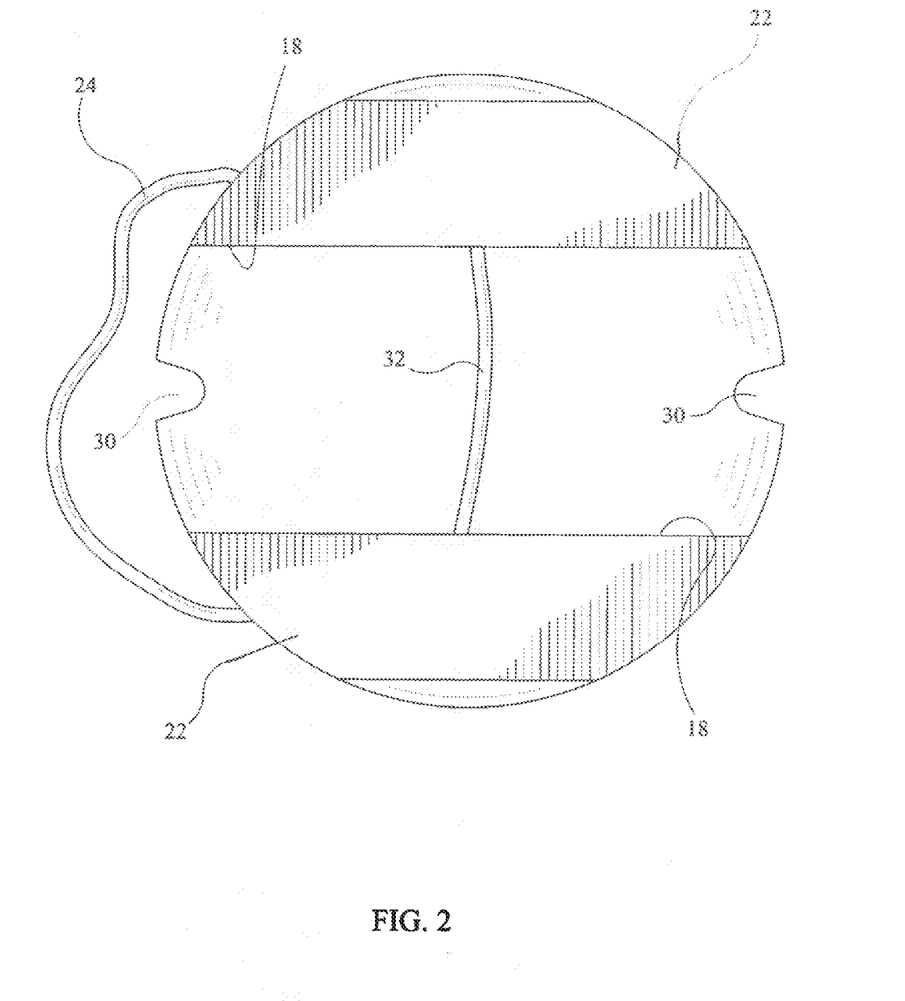
FIG. 2 is a rear view of the tactical room clearing mirror.
Figure 3:
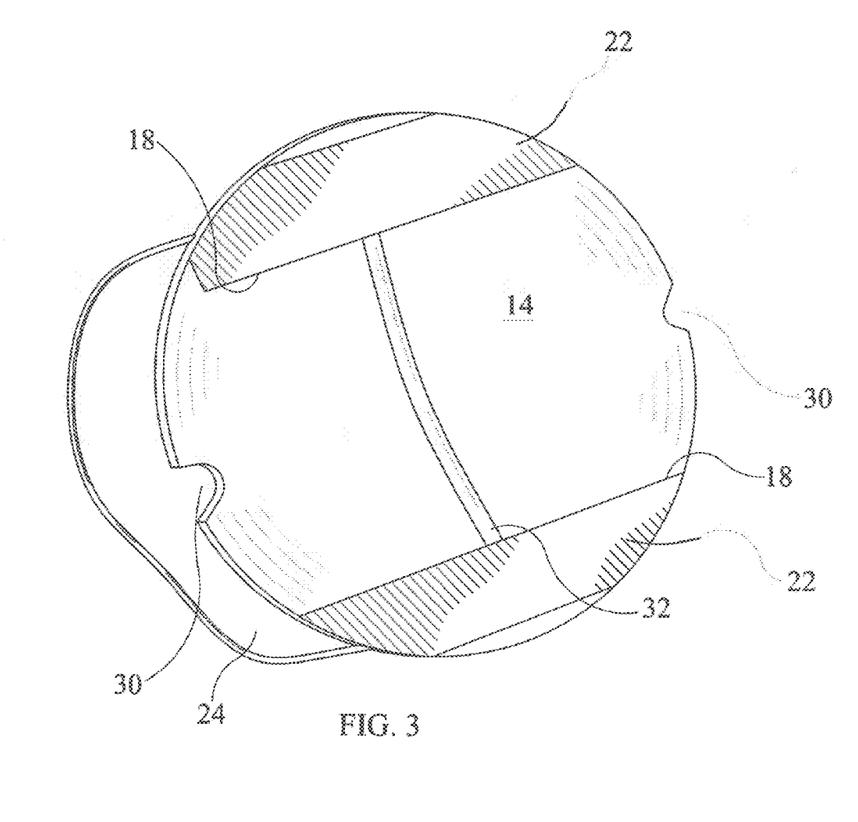
FIG. 3 is a rear perspective view thereof.
Figure 4:
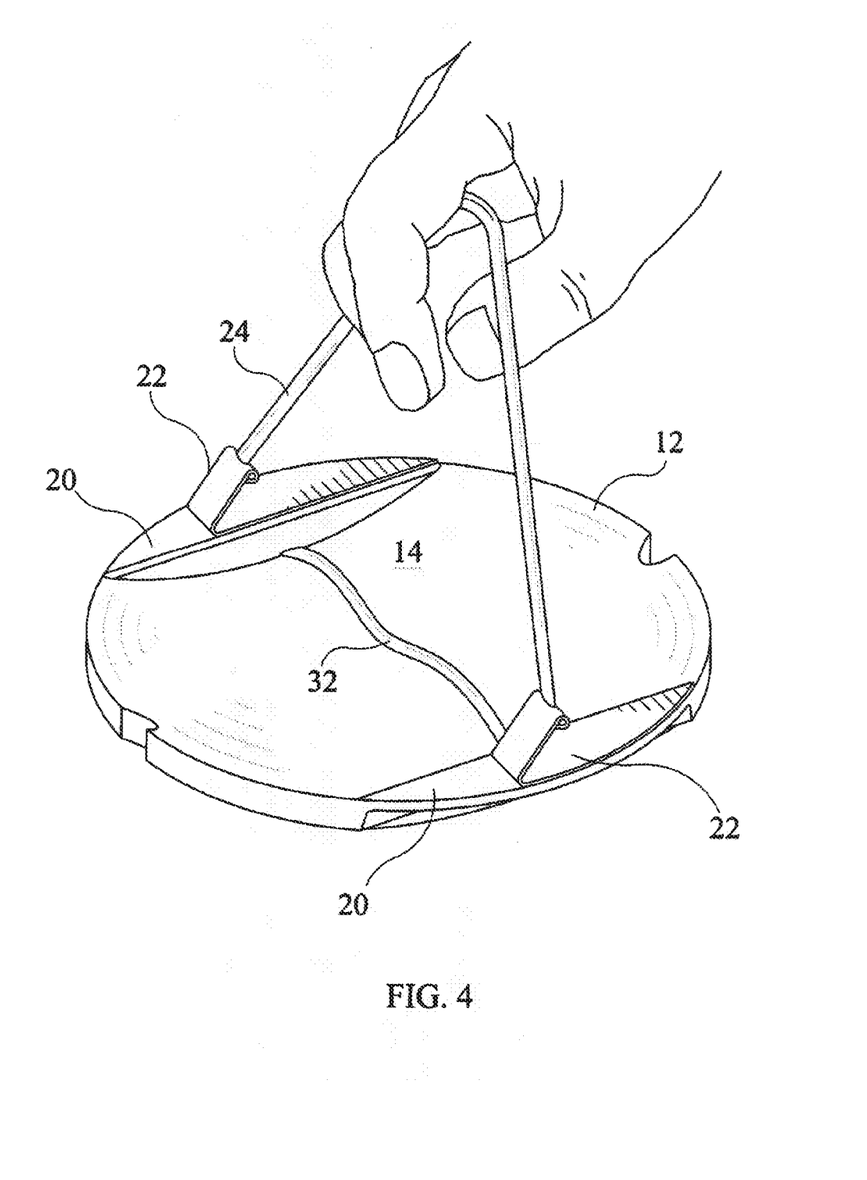
FIG. 4 is a rear view illustrating the user grasping the rip cord attached to the adhesive barriers.
Figure 5:
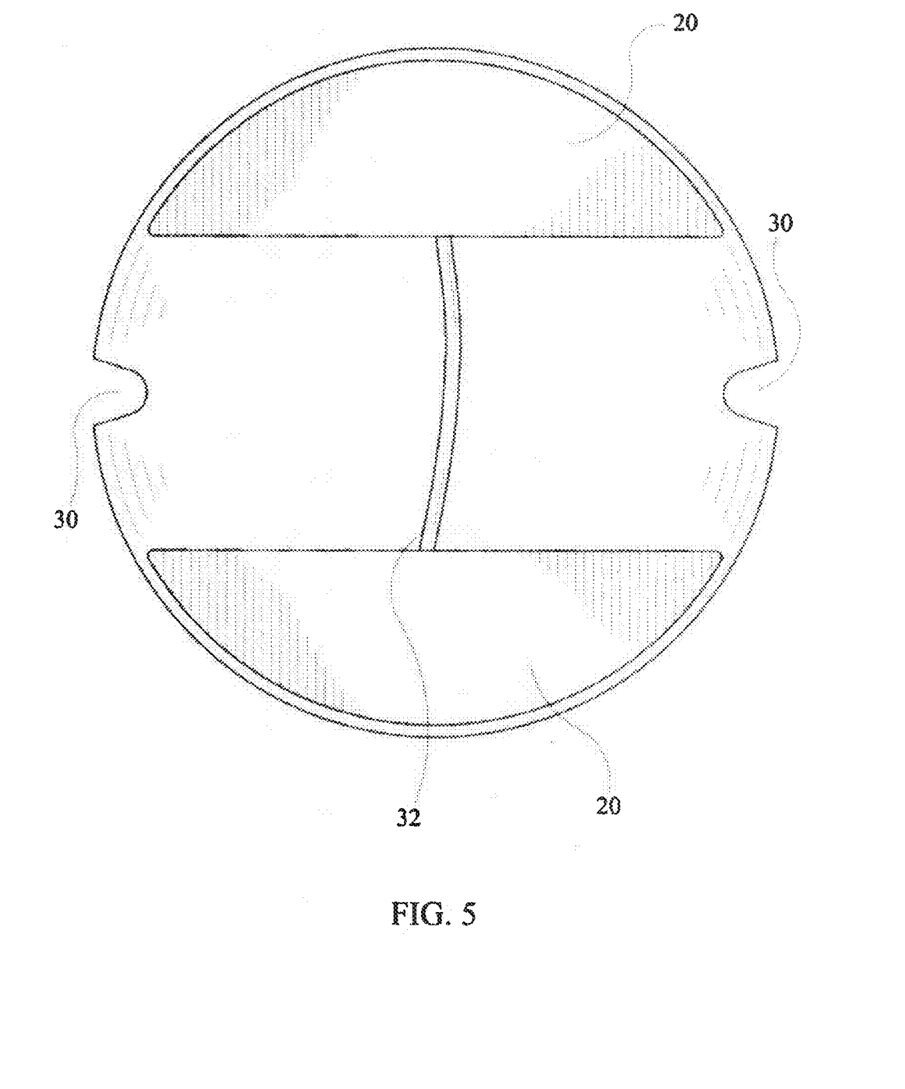
FIG. 5 is a rear view thereof with the adhesive barriers completely removed.

With reference now to the drawings, FIGS. 1-14 depict a man-portable tactical room clearing mirror system, generally referenced as 10, in accordance with the present invention. As best illustrated in FIG. 1, room clearing mirror system 10 includes at least one convex mirror apparatus 12 that may be rapidly deployed and adhesively affixed to a room entry door, referenced as D, which, when pushed open provides a room entry team member with a view of the room interior from a concealed cover position outside the room adjacent to the doorway. Mirror apparatus 12 is preferably sized to be easily carried and rapidly deployed by a person from a pocket or pouch. The system provides an entry team ember with a rapidly-deployable, adhesively-securable, convex mirror that may be affixed to the exterior of an inwardly opening room entry door so as to provide the entry team member(s) with a view of the room interior prior to entry thereby allowing the team member(s) to assess any possible threats from a concealed cover position outside the room prior to entry.

As best depicted in FIGS. 2-5, mirror apparatus 12 is preferably generally circular, and includes a rear mounting side 14 and an opposing front mirror side, generally referenced as 16. In a preferred embodiment, mirror apparatus has a diameter of between 3.0 and 10.0 inches, and preferably between about 4.0 and 6.0 inches. Mirror device may be fabricated from any suitable material, and preferably fabricated from a sturdy yet lightweight material to which a mirrored surface is either attached to, or integrally formed with. In accordance with a significant aspect of the present invention, mounting side 14 includes a pair of generally planar mounting surfaces 18 adapted for adhesively securing the mirror device to a vertical door surface. Each planar surface 18 includes a strip or layer of adhesive 20 (hereinafter "adhesive layer") and a peel-away protective strip 22 in removable covering relation therewith. A cord 24 is affixed to protective strips 22 and functions as a rip-cord to allow the user to quickly and easily peel away the protective strips thereby exposing the adhesive-coated planar mounting surfaces 18. Cord 24 may comprise natural or synthetic cord, rope, twine or any other suitable material. In an alternative, the protective strips may be adapted with one or more tabs to facilitate removal thereof. Once exposed, the adhesive substance 20 disposed on surfaces 18 functions to allow for rapid affixation of the mirror to a door whereby the mirror device may remain adhesively affixed and supported.

Figure 6:
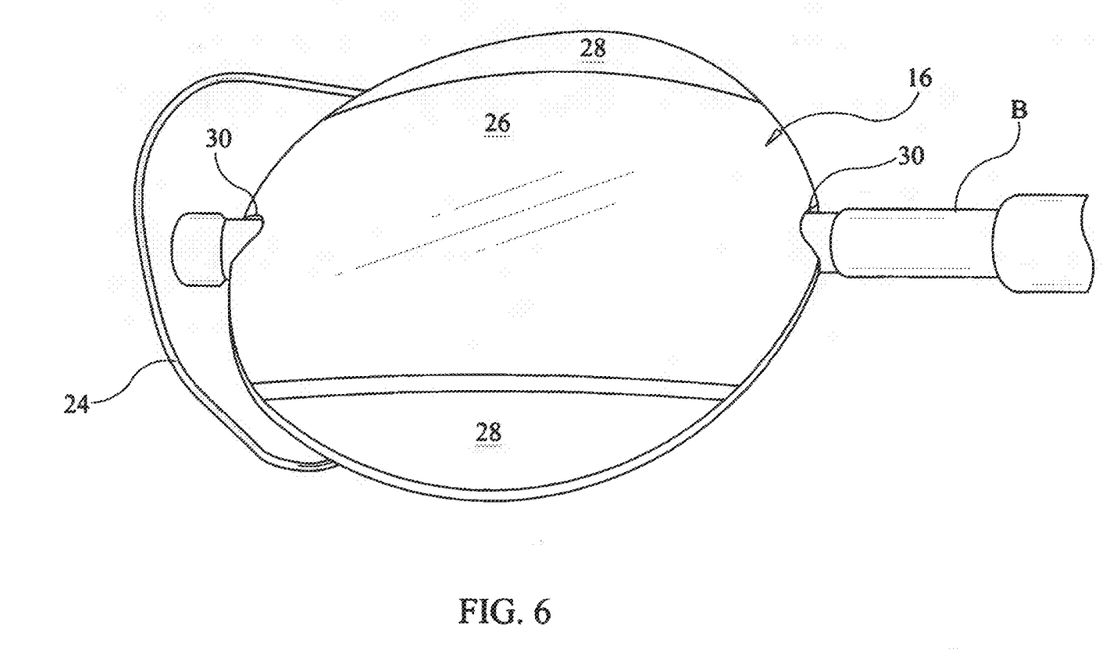
FIG. 6 is a front perspective view depicting the mirror affixed to a tactical baton.
Figure 10:
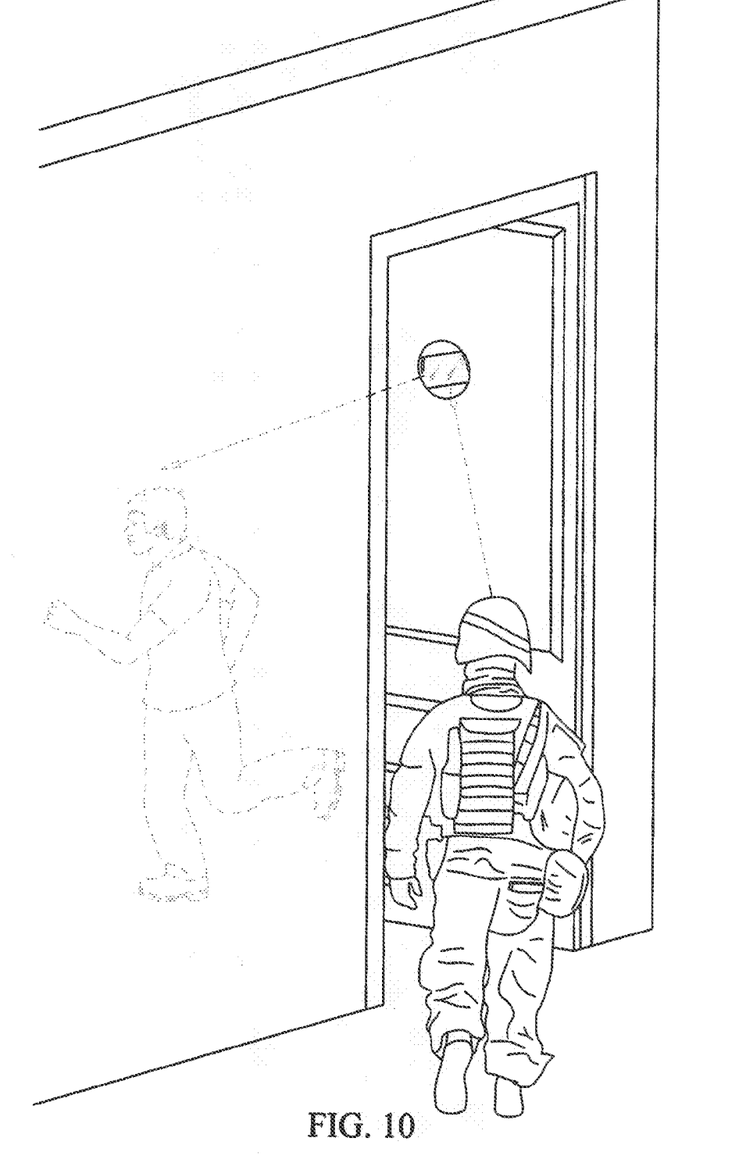
FIG. 10 illustrates a tactical mirror in accordance with the present invention adhesively affixed to a door to provide a wide field of view into a room to a user located outside the room.
Figure 11:
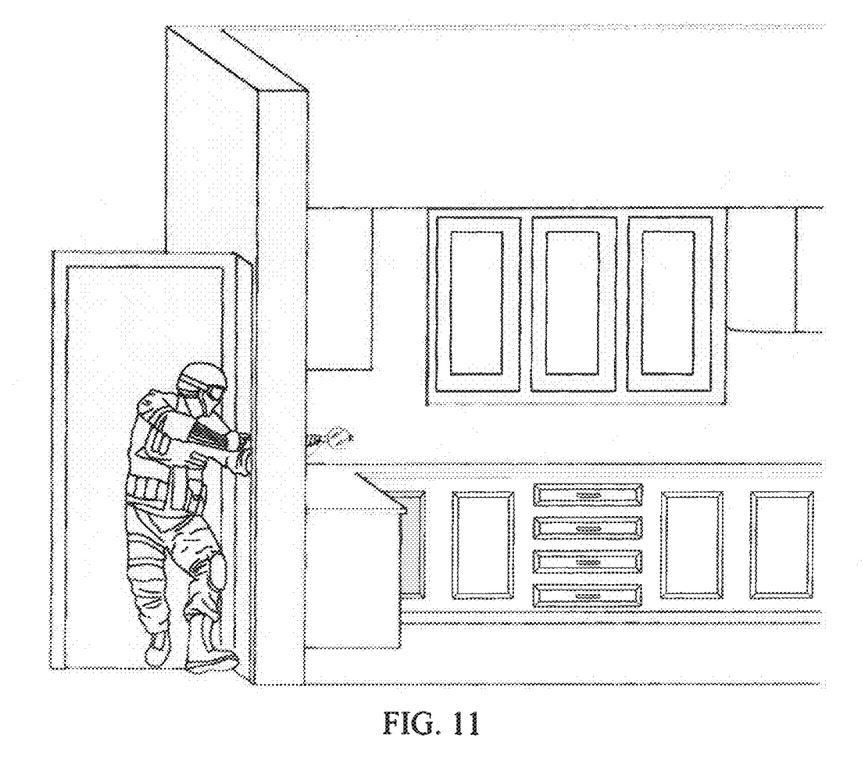
FIG. 11 illustrates a tactical mirror in accordance with the present invention affixed to a baton to provide a wide field of view into a room to a user handling the baton.
Figure 12:
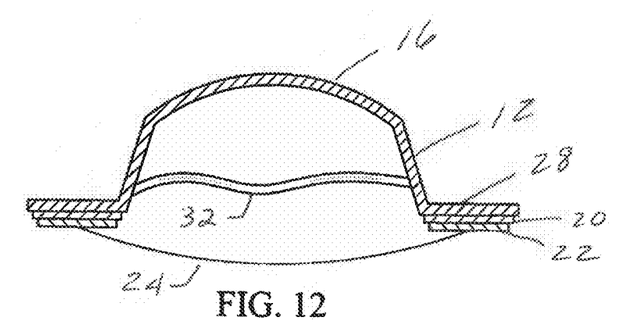
FIG. 12 is a sectional view of a tactical mirror in accordance with the present invention.
Figure 13:
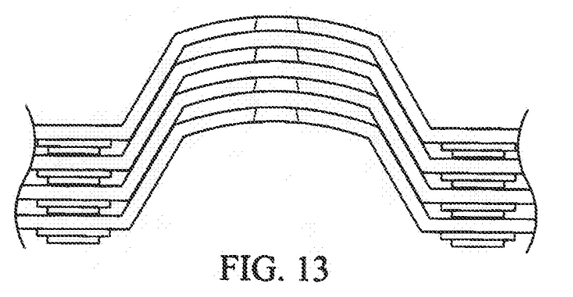
FIG. 13 is a side sectional view of a plurality tactical mirrors in a nested configuration.
Figure 14:
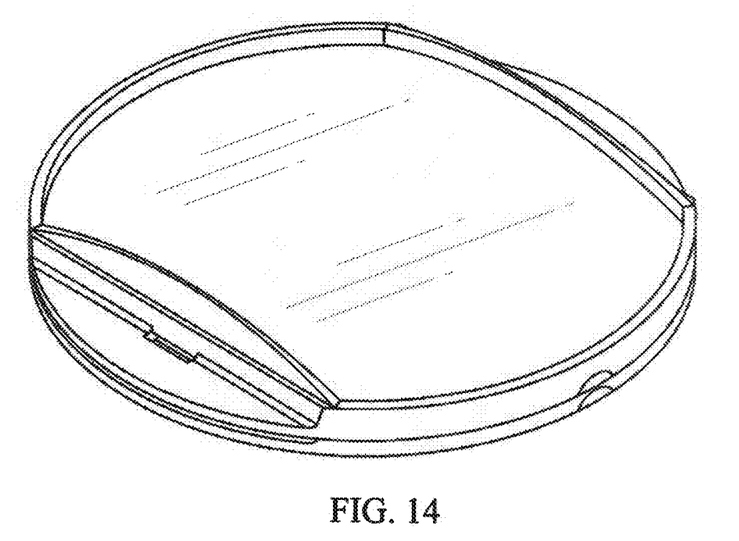
FIG. 14 is a top perspective view of tactical mirrors in a nested configuration.

As best seen in FIG. 6, the mirror side 16 includes a portion thereof forming a generally convex mirrored surface 26 which functions to provide a wide angle reflected field of view. In addition, the mirrored side 16 of convex mirror apparatus 12 preferably defines at least one, and in the preferred embodiment two laterally opposed recessed surfaces 28 which function to allow for nested stacking of a plurality of mirror devices in a compact nested configuration as illustrated in FIG. 10 thereby providing the user with a plurality of deployable mirror devices. Recessed surface are preferably generally planar. More particularly, recessed surfaces 28 result in mirrored surface 26 projecting upward relative surfaces 28. The upward projection may be received in a corresponding recess formed on the rear side of another mating device as illustrated in FIGS. 12-14.

Figure 7:
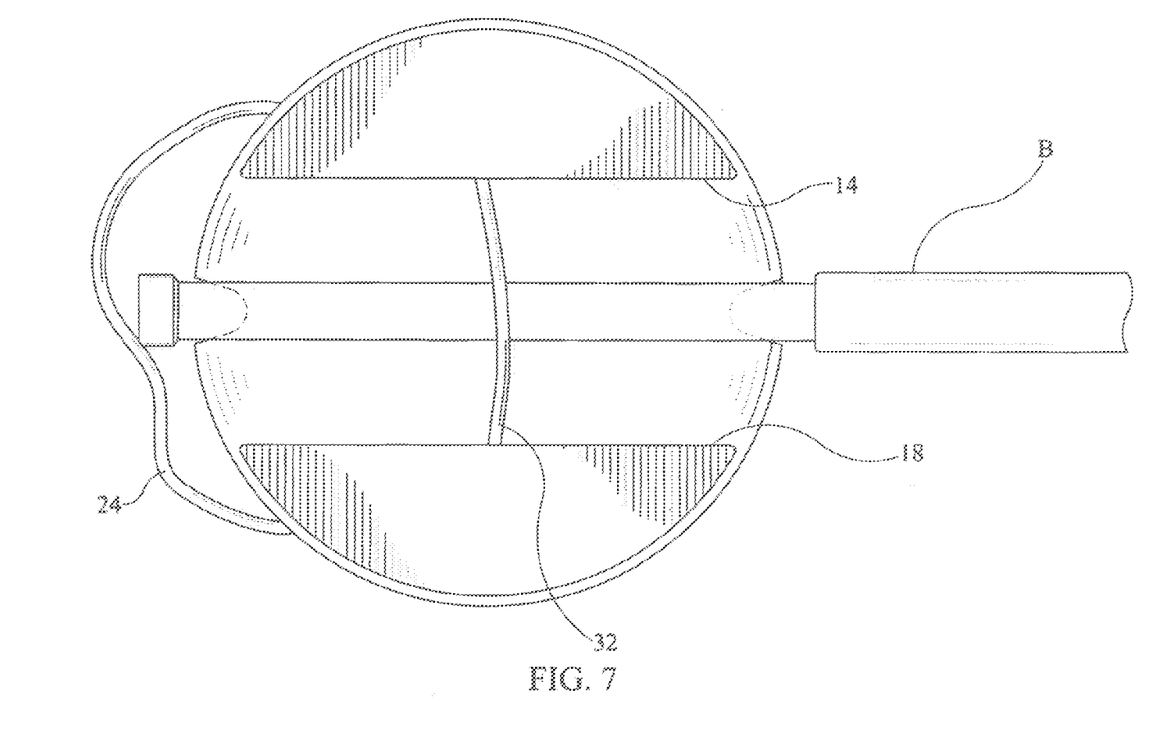
FIG. 7 is a rear view thereof.
Figure 8:
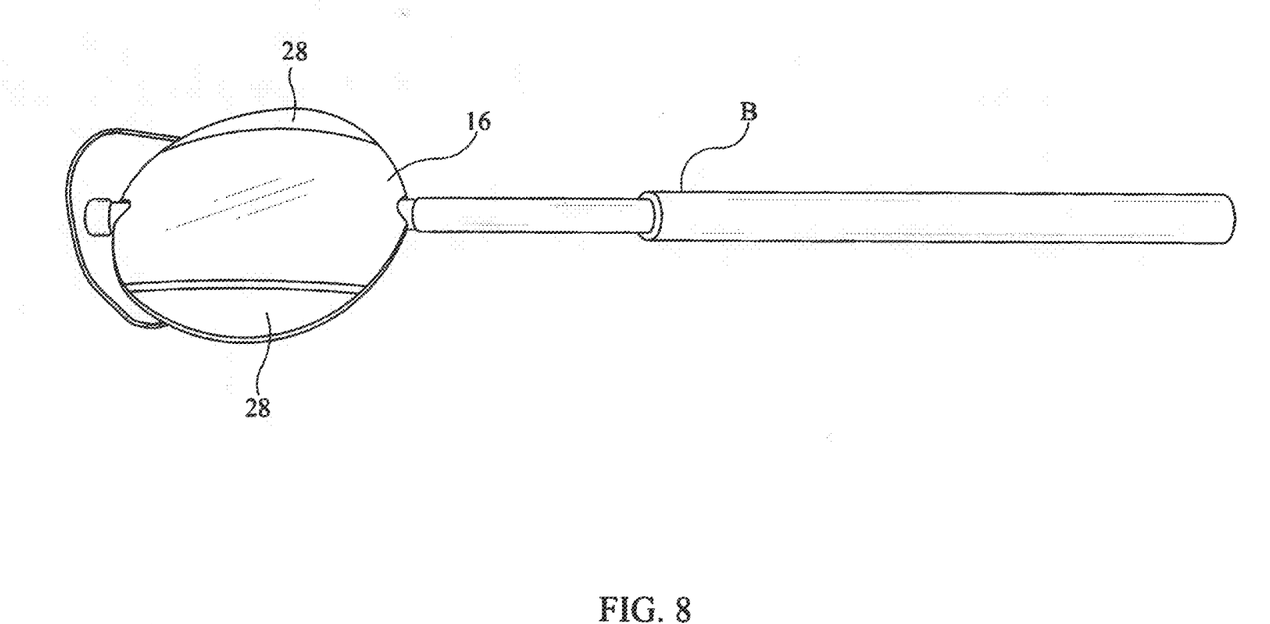
FIG. 8 is a front perspective view thereof.
Figure 9:
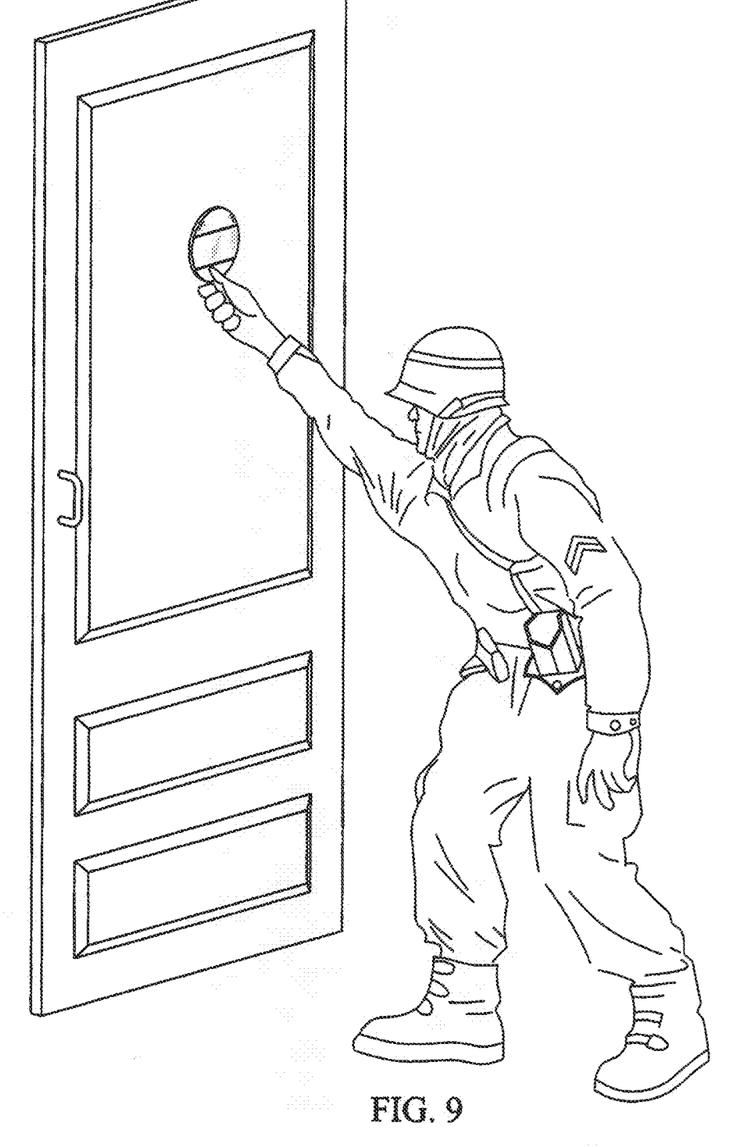
FIG. 9 illustrates a user adhesively affixing the tactical mirror to a door.

As best depicted in FIGS. 6-8, each mirror further includes a peripheral edge defining a pair of diametrically opposed notches 30 which allow mirror apparatus 12 to be removably mounted to a tactical baton. Notches 30 are preferably parabolic, however, any suitable notch shape is considered within the scope of the present invention. In addition, a resilient transversely disposed band 32 extends substantially across the mounting side 14 of mirror apparatus 12, and is disposed approximately 90-degrees relative to an imaginary line intersecting diametrically opposed notches 30. As best seen in FIG. 7, notches 30 and band 32 function to allow the mirror apparatus 12 to be removably mounted to a baton, referenced as B, to allow a room entry team member to manually extend and position the mirror so as to gain a view of the interior of a room while remaining outside of the room and safely positioned alongside the doorway. More particularly, notches 30 function to partially receive the cylindrical baton, and transversely disposed band 32 applies tension to baton B in order to maintain secure engagement between mirror apparatus 12 and baton B. This feature allows a room entry team member the ability to manually extend and selectively position mirror apparatus 12 without requiring affixation of the device to a surface.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A tactical mirror comprising:
   a mirror apparatus having a front side and an opposing rear side;

said front side including a mirror surface;

said rear side including at least one planar mounting surface;

said planar mounting surface having an adhesive layer; and said front side defining a shape configured to receive the back side of a second mirror apparatus in a nested configuration.

2. The tactical mirror according to claim 1 wherein said mirror surface is convex.

3. The tactical mirror according to claim 1 further including a peel-away protective strip disposed in removable covering relation with said adhesive layer.

4. The tactical mirror according to claim 3 further including a cord connected to said protective strip to facilitate removal thereof.

5. The tactical mirror according to claim 1 wherein said mirror apparatus includes a peripheral edge, said peripheral edge defining a pair or opposing notches, and resilient transversely disposed band, whereby said and said band facilitate the mounting of the tactical mirror to a baton.

6. The tactical mirror according to claim 1 wherein said mirror apparatus is generally circular.

7. A tactical mirror comprising:

a mirror apparatus having a front side, an opposing rear side, and a generally circular peripheral edge;

said front side including a convex mirror surface;

said peripheral edge defining a pair of diametrically opposed notches;

a resilient band having opposing ends connected to the rear side of said mirror apparatus, said resilient band substantially traversing said rear side;

said rear side including a pair of diametrically opposed planar mounting surfaces;

each of said planar mounting surfaces having an adhesive layer, and a peel-away protective strip disposed in removable covering relation with said adhesive layer; and a rip-cord attached to each of said protective strips, whereby said rip-cord allows for rapid removal of said protective strips thereby allowing said mirror apparatus to be adhesively affixed to a surface.

8. The tactical mirror according to claim 7, wherein said band has opposing ends affixed to said mirror apparatus each of said opposing ends being disposed approximately 90-degrees relative to said notches.

9. The tactical mirror according to claim 7, wherein a plurality of said mirror apparatus may be disposed in a compact nested configuration.

10. The tactical mirror according to claim 7, further including a baton, said mirror apparatus mountable on said baton with said notches receiving portions of said baton and said resilient band securing said mirror apparatus relative to said baton.

* * * * *